United States Patent [19]
Sakakibara et al.

[11] Patent Number: 4,732,048
[45] Date of Patent: Mar. 22, 1988

[54] WIPER DEVICE FOR VEHICLE

[75] Inventors: Kazuo Sakakibara, Toyokawa; Toshiaki Shimogawa, Okazaki; Satosi Kuwakado, Nukata; Akira Hoshino, Kariya, all of Japan

[73] Assignees: Nippondenso Co., Ltd., Kariya; Nippon Soken, Inc., Nishio, both of Japan

[21] Appl. No.: 909,291

[22] Filed: Sep. 19, 1986

[30] Foreign Application Priority Data

Sep. 19, 1985 [JP] Japan .................................. 60-207308
May 20, 1986 [JP] Japan .................................. 61-115956

[51] Int. Cl.⁴ ............................. A47L 1/00; B60S 1/02
[52] U.S. Cl. ........................................... 74/98; 74/52; 74/436; 74/437; 15/250.21; 15/250.23
[58] Field of Search .................. 74/436, 98, 384, 820, 74/52; 15/250.21, 250.23

[56] References Cited

U.S. PATENT DOCUMENTS

| | | | |
|---|---|---|---|
| 2,409,300 | 10/1946 | Miles | 74/436 |
| 2,516,808 | 7/1950 | Seger | 15/250.21 |
| 2,625,833 | 1/1953 | Johnson | 74/436 |
| 3,570,039 | 3/1971 | Ichinose et al. | 15/250.21 |
| 3,590,415 | 7/1971 | Mori | 15/250.21 |
| 3,651,699 | 3/1972 | Thomas et al. | 15/250.23 |
| 3,706,235 | 12/1972 | Duncan | 74/52 |
| 4,625,359 | 12/1986 | Egner-Walter et al. | 15/250.21 |
| 4,630,327 | 12/1986 | Schmidt et al. | 15/250.23 |

FOREIGN PATENT DOCUMENTS

| | | |
|---|---|---|
| 2194173 | 2/1974 | France . |
| 52-5377 | 2/1977 | Japan . |
| 59-151760 | 10/1984 | Japan . |
| 59-202955 | 11/1984 | Japan . |
| 855296 | 8/1981 | U.S.S.R. .................... 74/436 |
| 1116246 | 9/1984 | U.S.S.R. .................... 74/52 |

Primary Examiner—Lawrence Staab
Attorney, Agent, or Firm—Cushman, Darby & Cushman

[57] ABSTRACT

A wiper device for a vehicle, has a sub-arm turnably supported by a vehicle body through a supporting shaft provided in a base end thereof. An arm shaft is turnably provided in a tip end of the sub-arm and a base end of a wiper arm is fixed to the arm shaft. The supporting shaft has a cylindrical shape and a drive shaft is inserted into the cylindrical supporting shaft. One end of the drive shaft on the side of the sub-arm, is connected to the arm shaft by a gear mechanism and the other end of the drive shaft is connected to a drive source and is reciprocally turned thereby. To the outer surface of the supporting shaft is fixed a Geneva gear. On a circular plate turnably connected to the drive source is an eccentrically provided pin. When the arm shaft is outside a predetermined turn angle range, the pin is fitted in a notch of the Geneva gear to turn the supporting shaft and when the arm shaft is within a predetermined turn angle range, the pin is disengaged from the notch of the Geneva gear to stop the supporting shaft from turning.

10 Claims, 29 Drawing Figures

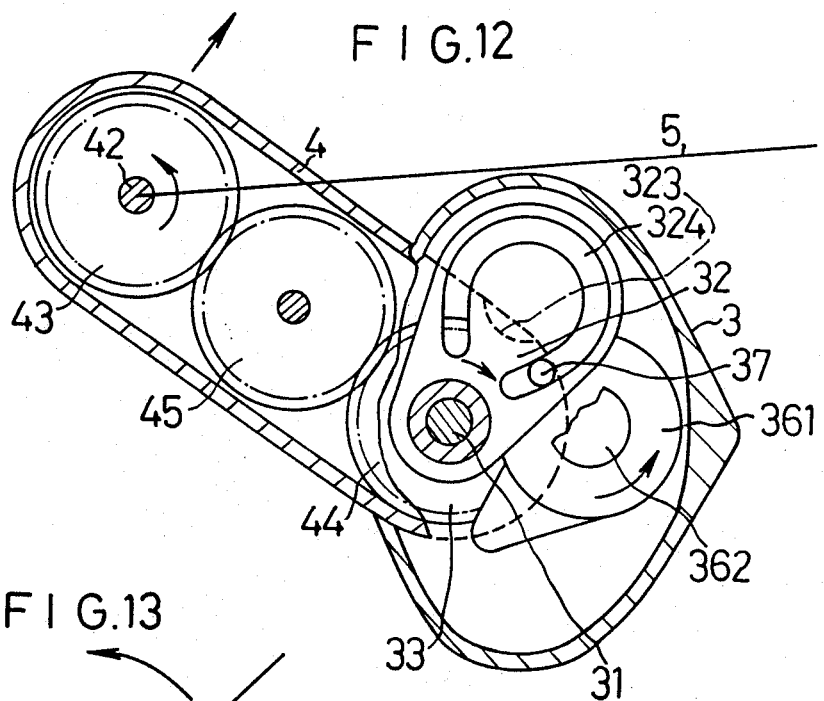
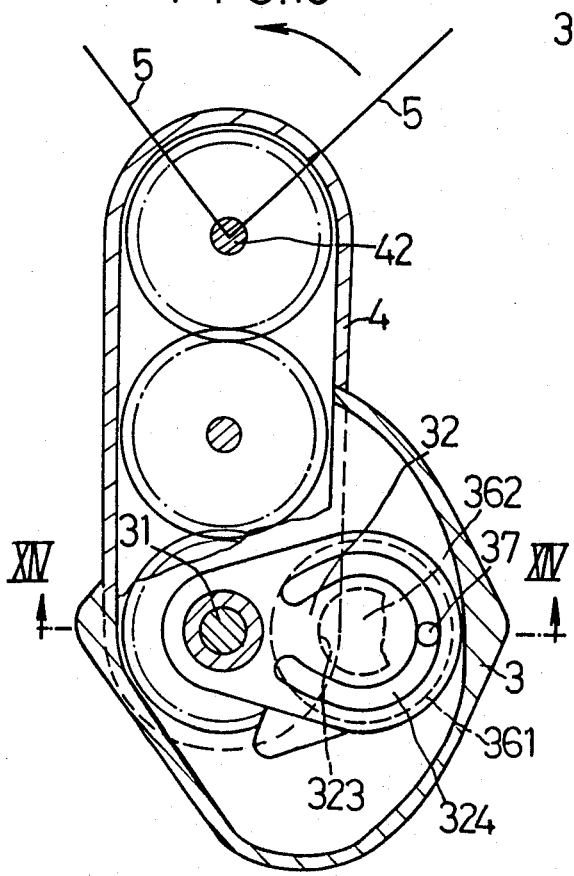
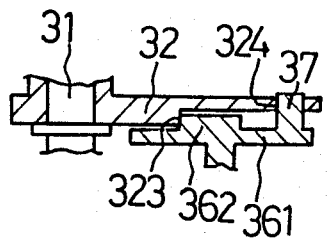

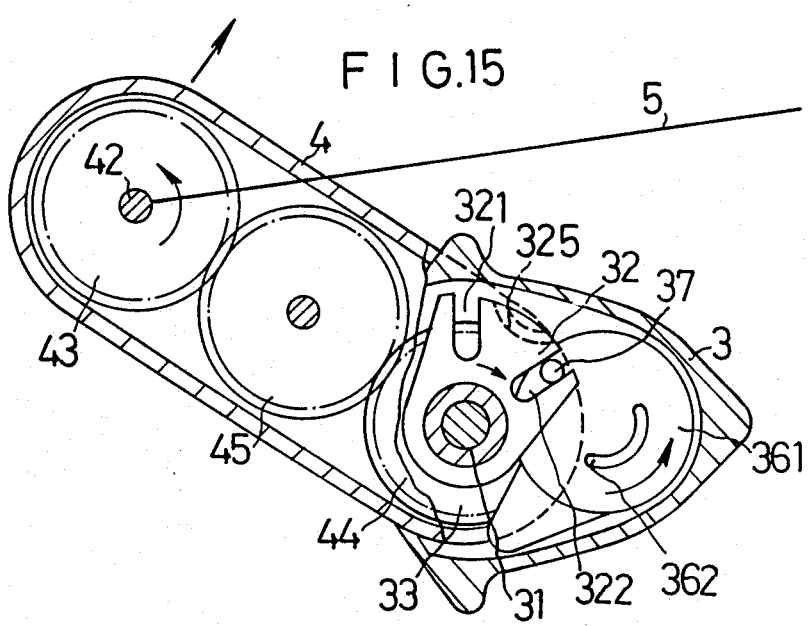
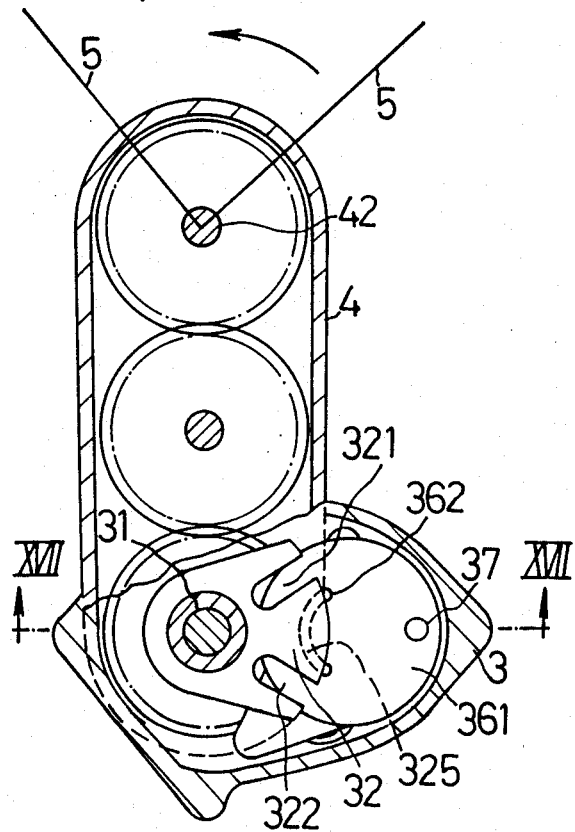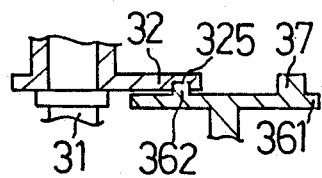

WIPER DEVICE FOR VEHICLE

BACKGROUND OF THE INVENTION

1. Field of the Invention

The present invention relates to a wiper device for a vehicle, and particularly to a wiper device for enlarging the wiping area thereof by moving a shaft of a wiper arm.

2. Description of the Prior Art

Recently, the size of a windshield glass of a vehicle has been increased vertically in order to improve the openness of a compartment of the vehicle.

The conventional wiper device of which the wiper arm is supported and turned by a shaft fixedly provided in the vicinity of an under side of the windshield glass, has a problem that a comparatively large unwiped area remains in the vicinity of the upper side of the windshield glass to have a bad effect on the visibility from the inside of a vehicle.

Unexamined Utility Model publication No. Sho 59-151760 and unexamined Patent publication No. Sho 59-202955 disclose examples of a wiper device having such a structure as to move the shaft of the wiper arm upward for overcoming the above described problem.

However, the device of the former publication has a structure where a plurality of links are combined with one another so as to require changes of design in accordance with the types of vehicles, and the device of the latter publication is inferior in the wiping especially in corner portions in the vicinity of the upper side of the windshield glass.

SUMMARY OF THE INVENTION

One object of the present invention is to provide a wiper device in which the wiping area is enlarged by moving a shaft of a wiper arm upward along a windshield glass.

Another object of the present invention is to provide a wiper device in which the design can be easily changed in accordance with the types of vehicles.

Still another object of the present invention is to provide a wiper device by which corner portions in the vicinity of the upper side of a windshield glass can be wiped more completely The wiper device of the present invention comprises a wiper arm, a sub-arm, one end of the sub-arm being provided with a supporting shaft turnably supported by a body of a vehicle, the other end of the sub-arm being provided with a turnable arm shaft to which a base end of the wiper arm is fixed, an arm shaft driving means for turning the arm shaft and a supporting shaft driving means for turning the supporting shaft, and stopping the turn of the supporting shaft within a predetermined turn angle range of the arm shaft.

According to the wiper device provided on the under side of the windshield glass, the shaft of the wiper arm provided in the sub-arm is moved upward along the windshield glass by turning the supporting shaft of the sub-arm. And while the shaft of the wiper arm is turned within a predetermined angle range, the turn of the supporting shaft of the sub-arm is stopped. At this time, the wiper arm is turned and operated in the state where the shaft of the wiper arm is located upward of the under side of the windshield glass.

This results in the wiper arm generating a long locus along the upper side of the windshield glass and accordingly a wide wiping area being obtained. Especially, according to the present invention, corner portions along the upper side of the windshield glass can be effectively wiped.

In addition, the wiper device of the present invention can be applied with ease to various types of vehicles of different windshield glass sizes.

BRIEF DESCRIPTION OF THE DRAWINGS

FIG. 1 is a perspective view of a windshield glass in which the wiper device is installed;

FIG. 2 is a sectional view of a main portion of the first embodiment of the wiper devices;

FIG. 3 is a sectional view taken along the line III—III of FIG. 2;

FIG. 4 is a sectional view taken along the line of IV—IV of FIG. 2;

FIG. 5 is a sectional view taken along the line V—V of FIG. 4:

FIGS. 6 through 8 are sectional views of the main portion of the first embodiment of the wiper device, each illustrating the operation of the device;

FIG. 6 illustrates the operation of the device, where the sub-arm is in the inclined position;

FIG. 7 illustrates the operation of the device, where the sub-arm is in the upright position;

FIG. 8 illustrates the operation of the device, where the sub-arm is in the inclined position;

FIG. 9 is a schematic view of the windshield glass, illustrating the operating area of a wiper arm;

FIGS. 12 through 14 illustrate a fourth embodiment of the wiper device according to the present invention;

FIGS. 12 and 13 are sectional views of a main portion of the wiper device;

FIG. 12 illustrates the operation of the device, where the sub-arm is in the inclined position;

FIG. 13 illustrates the operation of the device, where the sub-arm is in the upright position;

FIG. 14 is a sectional view taken along the line of XIV—XIV of FIG. 13;

FIGS. 15 through 17 illustrate a fifth embodiment of the wiper device according to the present invention;

FIGS. 15 and 16 are sectional views of a main portion of the wiper device;

FIG. 17 is a sectional view taken along the line of XVII—XVII of FIG. 16;

FIGS. 18 and 19 are sectional views of a main portion of the wiper device;

FIG. 20 is a sectional view taken along the line of XX—XX of FIG. 19;

FIG. 21 is a sectional view of a main portion of the wiper devices;

FIG. 22 is a sectional view taken along the line of XXII—XXII of FIG. 21;

FIG. 23 is a sectional view taken along the line of XXIII—XXIII of FIG. 22;

FIG. 24 is a sectional view of a gear wheel provided with electromagnetic clutches;

FIGS. 25 and 26 illustrate an eight embodiment of the wiper device according to the present invention;

FIG. 25 is a sectional view of a main portion of the wiper device;

DETAILED DESCRIPTION OF THE EMBODIMENTS

Figure 1:
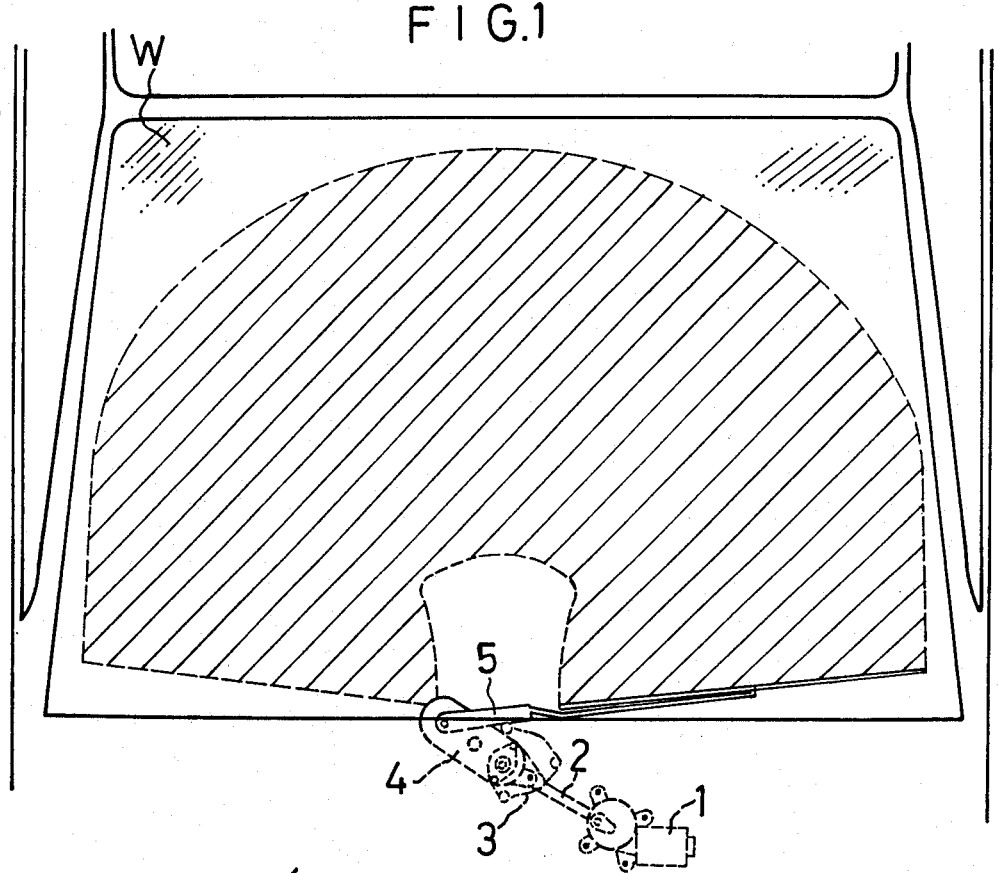
FIGS. 1 through 9 illustrate a first embodiment of a wiper device according to the present invention.

In FIG. 1, a wiper device is provided within a body of a vehicle along the under side of a front windshield glass W thereof.

The wiper device of the present invention comprises a drive motor 1, a gear box 3 connected to the drive motor 1 through a well known link mechanism 2, a sub-arm 4 of which one end is turnably supported by the gear box 3, and a wiper arm 5 turnably supported by the other end of the sub-arm 4.

Figure 3:
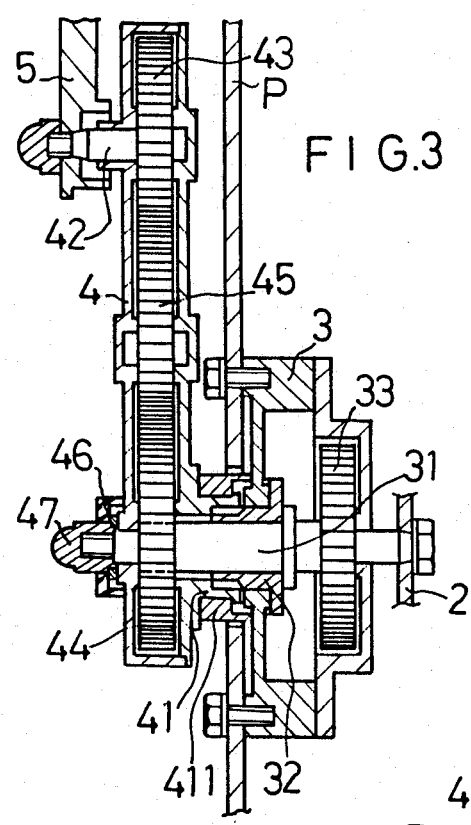
Figure 4:
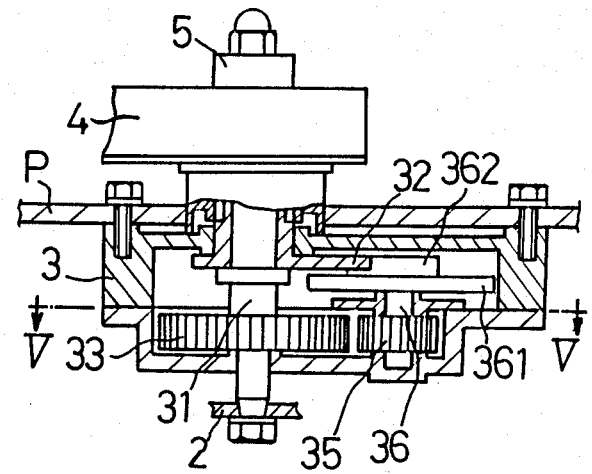

The gear box 3 is screwed to a body panel P as shown in FIGS. 3 and 4. And a drive shaft 31 penetrates the gear box 3 and projects on the reverse side of the panel P.

The link mechanism 2 is connected to a rear end of a drive shaft 31. The drive shaft 31 is reciprocally turned in accordance with the rotation of the drive motor 1.

The sub-arm 4 composes a casing. A cylindrical supporting shaft 41 is formed in one end of the sub-arm 4 so as to project toward the panel P. The drive shaft 31 is inserted into the supporting shaft 41. The supporting shaft 41 is spline-coupled with a Geneva gear 32 provided around one portion of the drive shaft 31, which penetrates the gear box 3, so as to be relatively rotated with respect to the drive shaft 31.

An arm shaft 42 is turnably provided in the other end of the sub-arm 4. And a base portion of the wiper arm 5 is fixed to the arm shaft 42.

The arm shaft 42 and the drive shaft 31 are connected to each other by means of gears 43, 44 provided in the arm shaft 42 and the drive shaft 31, respectively and an intermediate gear 45 provided between the gears 43 and 44 so as to rotate as one body.

The movement of the sub-arm 4 in the axis direction of the shaft 31 is limited by a nut 47 screwed to a tip end of the drive shaft 31 penetrating the sub-arm 4 through a washer 46, and a spacer 411 provided between the sub-arm 4 and the gear box 3.

Figure 5:
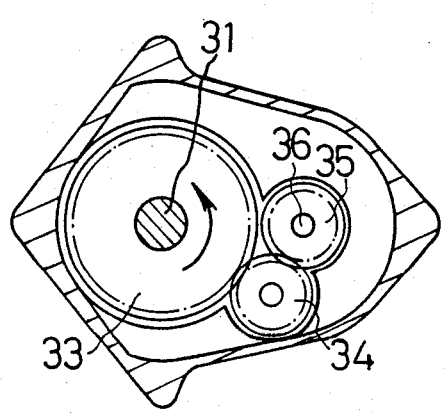

A gear 33 fixed to the outer periphery of the drive shaft 31 is provided along the bottom wall of the gear box 3 as shown in FIG. 5.

The gear 33 is connected to a gear 35 arranged on the same level and supported by the gear box 3, through an intermediate gear 34.

A central axis 36 of the gear 35 extends within the gear box 3 and a tip end thereof is formed into a circular plate 361 as shown in FIG. 4.

Figure 2:
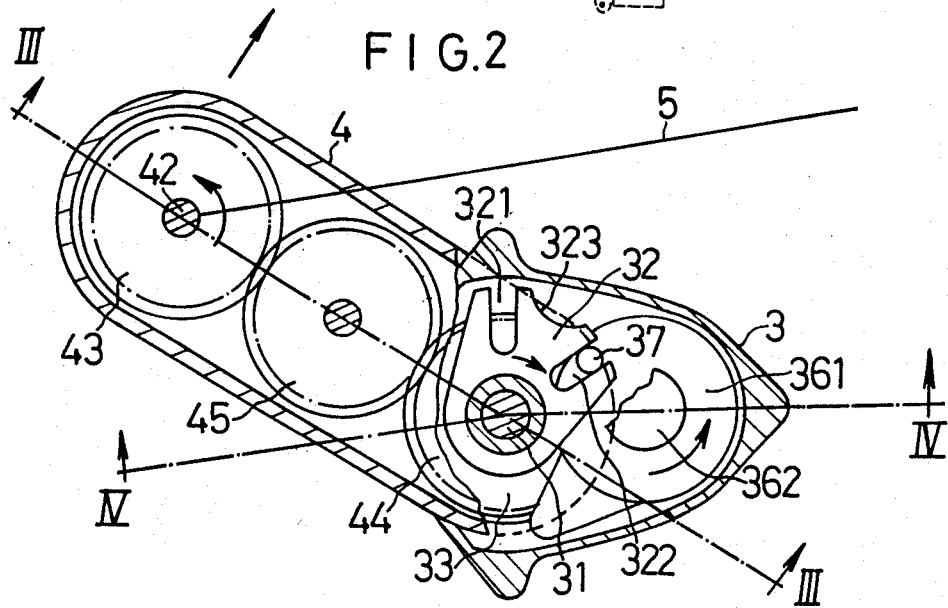

A semi-circular cam portion 362 projects from the center of the circular plate 361 and a pin 37 projects from the outer peripheral portion of the circular plate 361 as shown in FIG. 2.

A Geneva gear 32 is turnably fitted on the outer surface of the drive shaft 31. Two notches 321 and 322 are formed in the Geneva gear 32 so as to be circumferentially spaced from each other. Each of two notches 321 and 322 extends from the outer surface toward the center of the Geneva gear 32. An arc-shaped concave portion 323 having a radius of curvature equal to that of the cam portion 362 is formed in the outer surface of the Geneva gear 32 between the notches 321 and 322.

In the drawing, the pin 37 is closely fitted in the notch 322.

When the drive motor 1 is operated, the drive shaft 31 is rotated through the link mechanism. This rotating force is transmitted to the arm shaft 42 through the gears 43, 44 and 45 within the sub-arm 4 and also transmitted to the circular plate 361 through the gears 33, 34 and 35.

The rotation of the drive shaft 31 in the direction of the arrow in FIG. 5 causes the arm shaft 42 and the circular plate 361 to rotate counterclockwise as shown in FIG. 2. This results in the pin 37 of the circular plate 361 turning the Geneva gear 32 clockwise as shown by the arrow in FIG. 2, and accordingly the sub-arm 4 being turned clockwise around the drive shaft 31.

Figure 6:
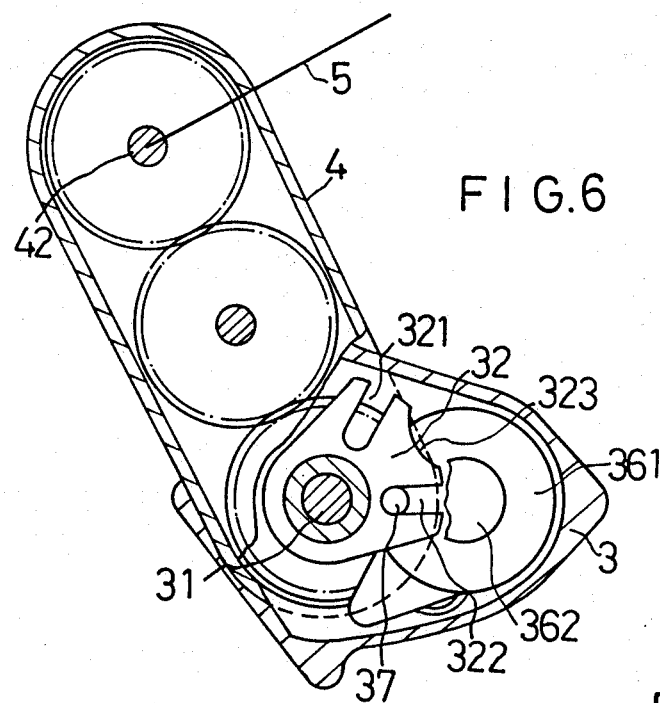
Figure 7:
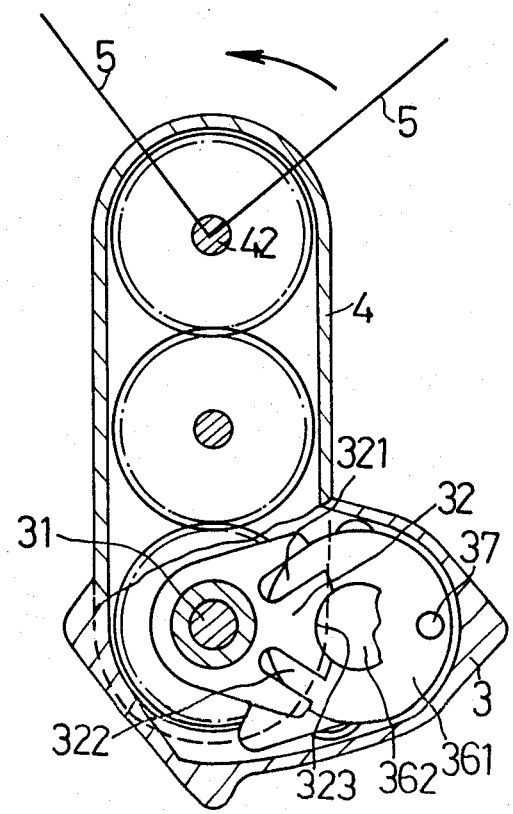

The continuous rotation of the drive shaft 31 causes the sub-arm 4 to continuously turn clockwise from the inclined position shown in FIG. 6 to the upright position shown in FIG. 7.

In this period of time, the arm shaft 42 continues its counterclockwise rotation.

When the sub-arm 4 reaches the upright state, the pin 37 on the circular plate 361 is disengaged from the notch 322 of the Geneva gear 32 as shown in FIG. 7, and at the same time, the concave 323 of the gear 32 is fitted on the cam portion 362. This results in the sub-arm 4 remaining upright even by the rotation of the circular plate 361. Only the wiper arm 5 continues turning counterclockwise as shown by the arrow in the drawing due to the continuous transmission of the rotating force of the drive shaft 31 to the arm shaft 42.

Figure 8:
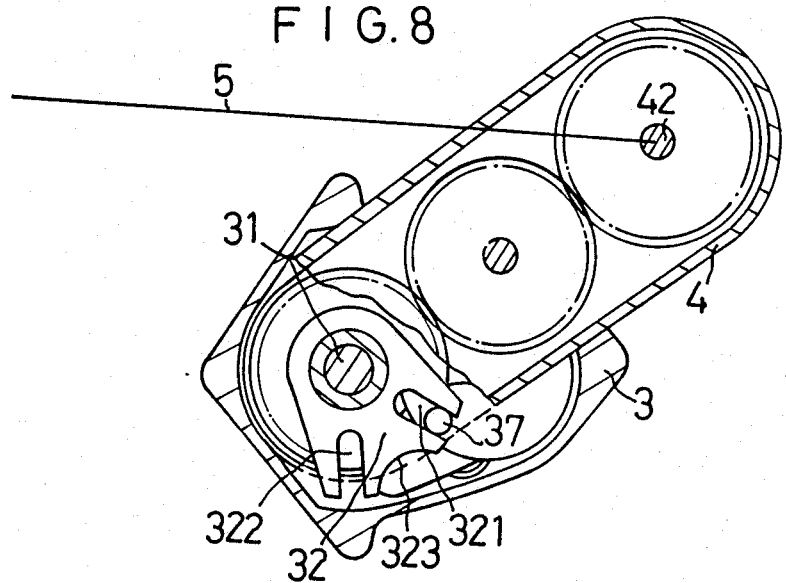

When the circular plate 361 is turned further, the pin 37 is closely fitted in the notch 321 of the Geneva gear 32 and engaged therewith to rotate the gear 32 clockwise. And the sub-arm 4 also turns clockwise from its upright position as shown in FIG. 8.

Figure 9:
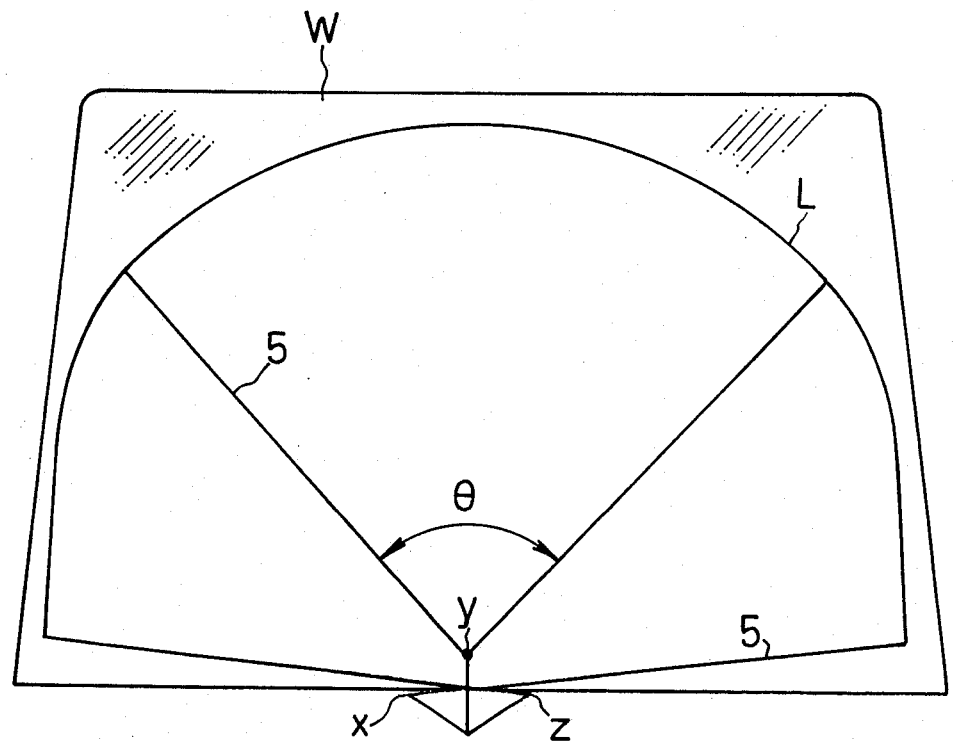

Thus, the arm shaft 42 of the wiper arm 5 moves upward generating an arc-shaped locus passing pints X, Y, Z in FIG. 9 and the wiper arm 5 is turned around the moving arm shaft 42.

According to the wiper device of the present embodiment the turn of the sub-arm 4 is stopped and the sub-arm 4 is kept upright(point y in the drawing) when the arm shaft 42 turns by a predetermined angle range of θ.

This results in the tip end of the wiper arm 5 generating a long locus especially in the portion along the upper side of the windshield glass W as shown by the line L in the drawing. Accordingly, a wide wiping area reaching the upper side of the windshield glass W and the corner portions thereof as shown by diagonal lines in FIG. 1, can be obtained.

Figure 10:
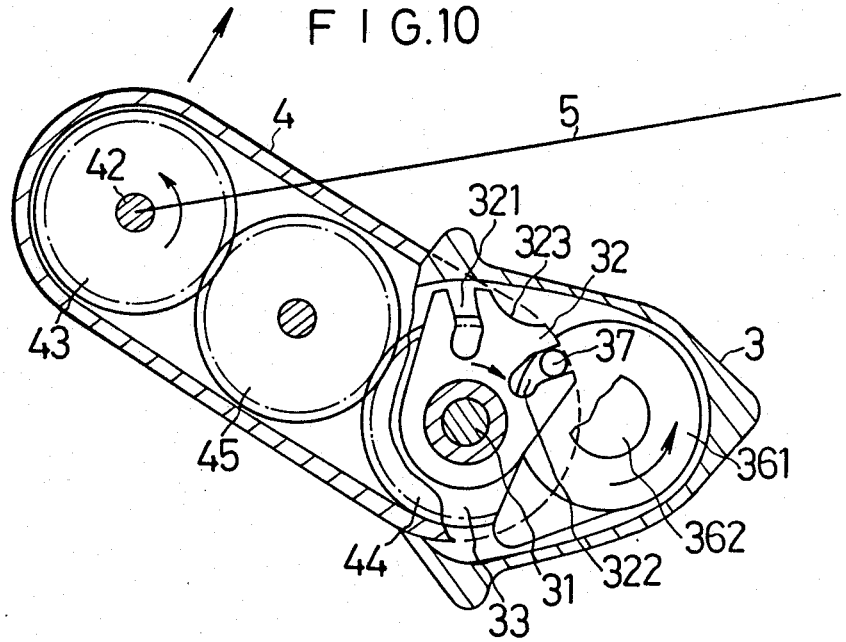
FIG. 10 is a sectional view of a main portion of a second embodiment of the wiper device according to the present invention.

FIG. 10 illustrates a second embodiment of the wiper device according to the present invention.

In FIG. 10, the notches 321 and 322 are curved in the circumferential direction like arcs. This results in the pin 37 being smoothly inserted. By changing the shape of the notches 321 and 322 voluntarily, the turn angle and the turn speed of the sub-arm 4 can be changed.

Figure 11:
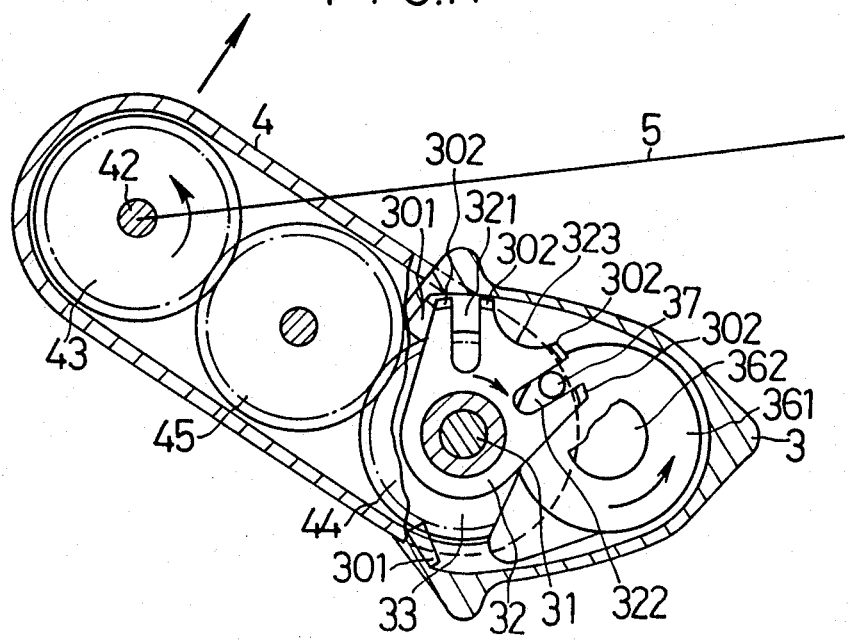
FIG. 11 is a sectional view of a main portion of a third embodiment of the wiper device according to the prsent invention.

FIG. 11 illustrates a third embodiment of the wiper device according to the present invention.

In FIG. 11, an elastic material 302 is attached to the outer surface of the Geneva gear 32 along an opening end of each of the notches 321 and 322 and an elastic material 301 is attached to the inner wall of the gear box 3 in order to prevent the Geneva gear 32 from directly coming in contact with the inner wall of the gear box 3. By virtue of the above structure, noise is decreased when the pin 37 is closely inserted into the notch 321 or 322 or when the Geneva gear 32 is turned.

FIGS. 12 through 14 illustrate a fourth embodiment of the wiper device according to the present invention.

In FIGS. 12 and 13, the Geneva gear 32 has a shape like an ellipse of which one side has a larger diameter. A horseshoe-shaped long hole 324 is formed in one side of the Geneva gear 32 having a larger diameter, along an outer periphery thereof and the pin 37 is inserted into the horseshoe-shaped long hole 324 as shown in FIG. 14.

Each of end portions of the long hole 324 is formed into the shape equal to that of each of the notches 321 and 322 shown in FIG. 6. And the intermediate portion of the long hole 324 is formed like an arc corresponding to the locus of the pin 37.

In operation, when the circular plate 361 is turned and the pin 37 is moved, the Geneva gear 32 and the sub-arm 4 are turned. These turns of the Geneva gear 32 and the sub-arm 4 are stopped while the sub-arm 4 is in the upright state and the pin 37 is moved along the intermediate portion of the long hole 324 as shown in FIG. 13.

According to the fourth embodiment, the position of the Geneva gear 32 is determined by means of the pin 37 when being positioned near both ends of the long hole 324. This results in the process of movement of the pin 37 in the intermediate portion of the long hole 324 and the process of engagement of the cam portion 362 with the concave portion 323 continuing smoothly.

FIGS. 15 through 17 illustrate a fifth embodiment of the wiper device according to the present invention.

In FIGS. 15 and 16, an arc-shaped groove 325 is formed in the under surface of the Geneva gear 32 between the notches 321 and 322 as shown in FIG. 17.

The cam portion 362 of the circular plate 361 has an arclike shape and extends along the circumference thereof. In the upright position of the sub-arm 4 as shown in FIG. 16, the cam portion 362 is closely inserted into the groove 325 to keep the upright state of the arm 4.

According to the fifth embodiment, the disengagement of the pin 37 from the notches 321 and 322 and the engagement of the cam portion 362 with the groove 325 are continuously effected with smooth operation.

Figure 18:
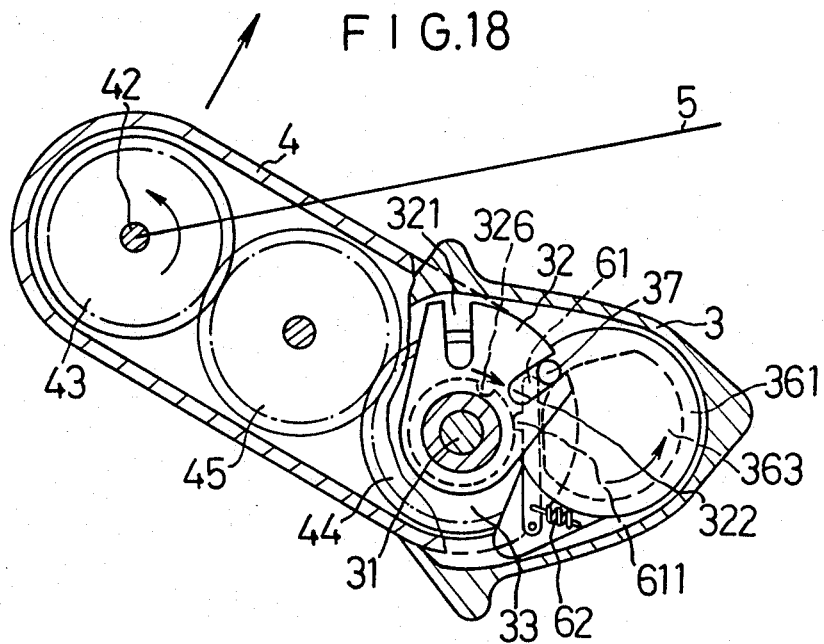
FIGS. 18 through 20 illustrate a sixth embodiment of the wiper device according to the present invention.
Figure 19:
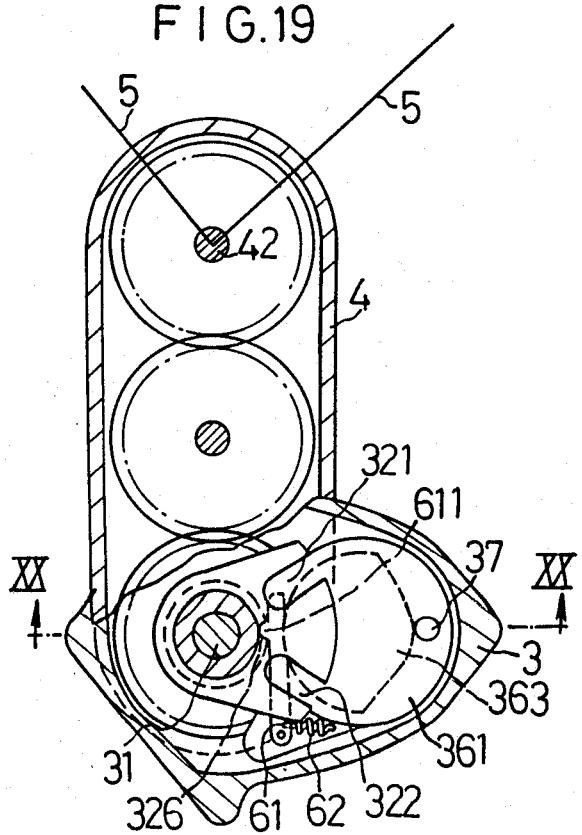
Figure 20:
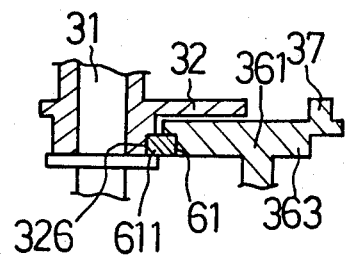

FIGS. 18 through 20 illustrate a sixth embodiment of the wiper device according to the present invention. In the drawings, a lever 61 is provided below the circular plate 361. A base end of the lever 61 is turnably supported by the wall of the gear casing 3, and a coil spring 62 is stretched between the lever 61 and the wall of the gear casing 3. The lever 61 is made come in contact with the outer surface of the cam portion 363 by the spring force of the coil spring 62.

The cam portion 363 has two circumferential surfaces, each having a semicircular section. One circumferential surface extends along the outer circumference of the circular plate 361. The remaining circumferential surface of the cam portion 363 slightly retreats from the above one circumferential surface.

A convex portion 611 is formed in the side surface of the lever 61, and a concave portion 326 is formed in one portion of the outer periphery of the central axis of the Geneva gear 32.

While the pin 37 is closely inserted into the notches 321(or 322) as shown in FIG. 18, the lever 61 is in contact with the above described remaining circumferential surface of the cam portion 363, and the convex portion 611 is apart from the central axis of the Geneva gear 32.

Next, when the circular plate 361 is turned and the sub-arm 4 becomes upright as shown in FIG. 19, the lever 61 comes in contact with the above described one circumferential surface of the cam portion 363 and moves toward the central axis of the Geneva gear 32. Then, the convex portion 611 of the lever 61 is fitted into the concave portion 326 of the Geneva gear 32 to keep the lever 61 upright.

FIGS. 21 through 24 illustrate a seventh embodiment of the present invention, employing an electromagnetic clutch instead of the Geneva gear 32.

Figure 21:
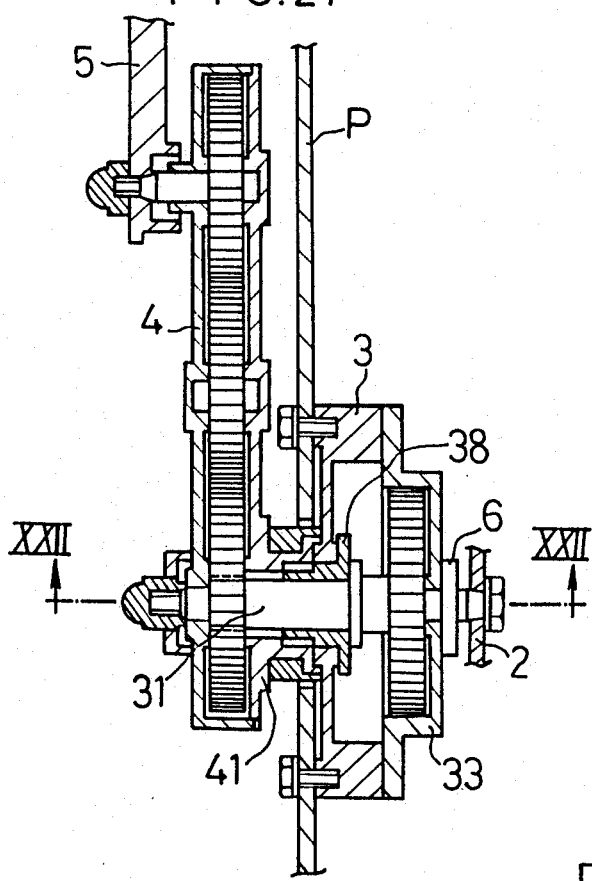
FIGS. 21 through 24 illustrate a seventh embodiment of the wiper device according to the present invention.
Figure 22:
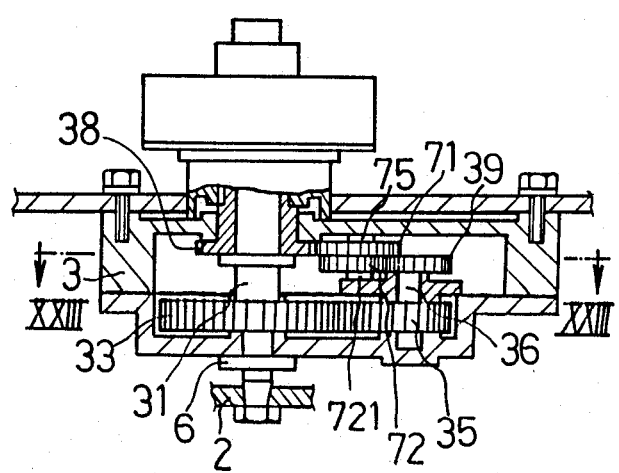
Figure 23:
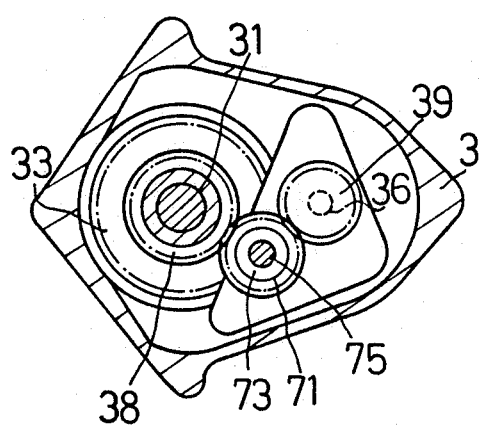

In FIGS. 21 and 22, a rotary sensor 6 is provided in a rear end portion of the drive shaft 31. The angle output signal of the sensor 6 is inputted to a control device( not shown). A spur gear 38 is fitted on the outer periphery of the drive shaft 31 penetrating within the gear box 3, and is spline-coupled with a cylindrical supporting shaft 41 of the sub-arm 4 in the central cylindrical portion. The gear 38 is engaged with one of gears 71 and 72 of the same diameter, which are piled on each other vertically as shown in FIG. 22. The other one of the gears 71 and 72 is engaged with a gear 39 fixed to the central axis 36 of the gear 35.

Figure 24:
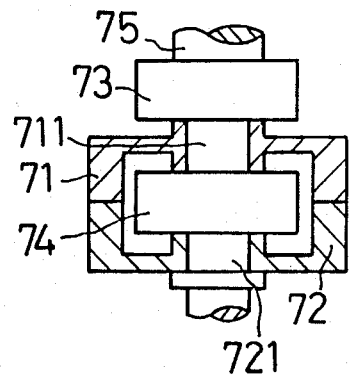

As shown in FIG. 24, the gears 76 and 72 are provided with electromagnetic clutches 73 and 74 respectively. The electromagnetic clutch 73 is disposed between a central axis 711 of the gear 71 and a fixed shaft 75 fixed to the wall of the gear box 3 while the electromagnetic clutch 74 is disposed between the central axes 711 and 721 of the gears 71 and 72.

The other construction of this embodiment is substantially equal to that of the first embodiment.

In operation, when the central axes 711 and 721 are connected by operating the electromagnetic clutch 74 by means of a control device(not shown), the rotation of the drive shaft 31 is transmitted from the gear 33 to the sub-arm 4 through the gears 35, 39, 72, 71 and 38 to turn the sub-arm 4.

By operating the electromagnetic clutch 73 instead of the electromagnetic clutch 74, the central axis 711 is disconnected from the central axis 721 and then connected to the fixed axis 75. This results in the rotation of the drive shaft 31 being not transmitted to the sub-arm 4 and accordingly, the sub-arm 4 being held at a predetermined turn position by locking the central axis 711 of the gear 71.

Furthermore, by selectively operating the electromagnetic clutches 73 and 74 within a predetermined angle range detected by the rotary sensor 6, operation effect similar to that of the first embodiment can be obtained.

FIGS. 25, 26A, 26B, and 26C illustrate an eighth embodiment of the wiper device according to the present invention wherein noncircular planetary gearing is employed instead of the Geneva gear 32.

Figure 25:
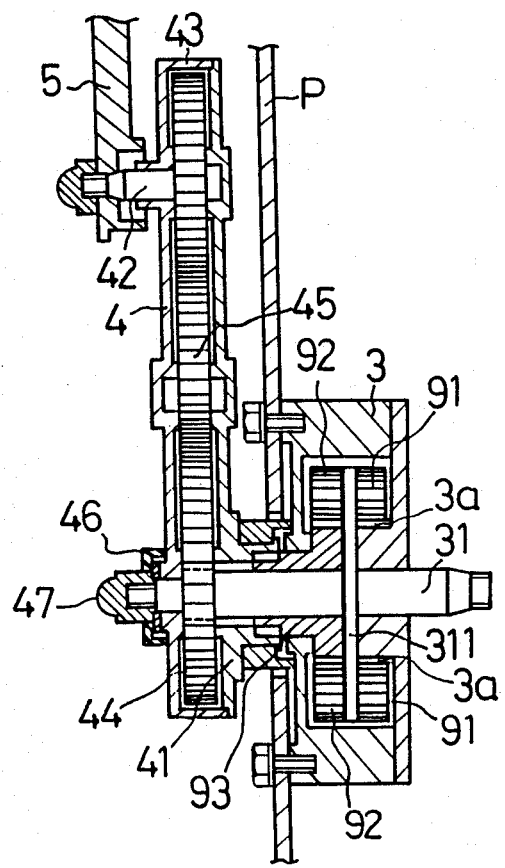

In FIG. 25, a flange portion 311 is formed in the outer periphery of one portion of the drive shaft 31, which penetrates the gear box 3. And circular planetary gears 91 and noncircular planetary gears 92 are provided at radially symmetrical positions of the flange portion 311.

These planetary gears 91 and 92 are opposed to each other through the flange portion 311 and are supported by the flange portion 311 through a common rotation shaft.

Each gear 91 is engaged with a teeth profiled portion 3a formed in the outer surface of a wall surrounding the drive shaft 31 while the gear 92 is engaged with a noncircular central gear 93 which turnably fits on the drive shaft 31.

The central gear 93 is spline-coupled with the supporting shaft 41 of the sub-arm 4.

Figure 26A:
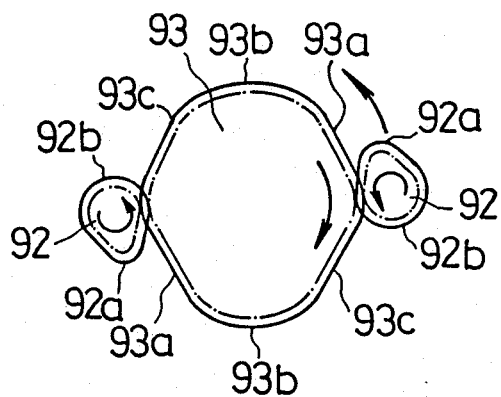
FIGS. 26A, 26B and 26C are front views of a planetary gear mechanism.

Each noncircular gear 92 has a noncircular portion 92a and a circular portion 92b as shown in FIG. 26A, each being nearly the half of the outer surface of the gear 92.

The non circular portion 92a has a pitch circle smaller than that of the circular portion 92b.

The outer surface of the noncircular gear 93 is divided into six portions, that is noncircular portions 93a and 93c and circular portions 93b. The pitch circle of the noncircular portions 93a and 93c is made larger than that of the circular portion 93b.

When the drive shaft 31 is rotated, the gears 92 revolve round the gear 93 while rotating on its axis as shown by arrows in the drawings.

Figure 26B:
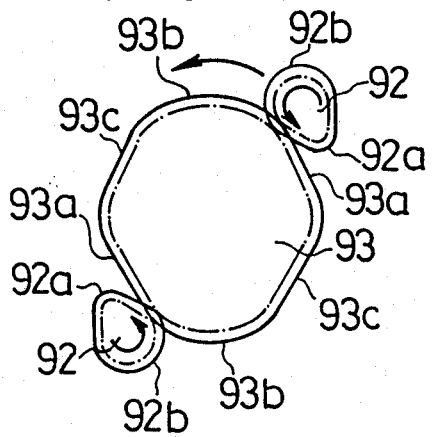
Figure 26C:
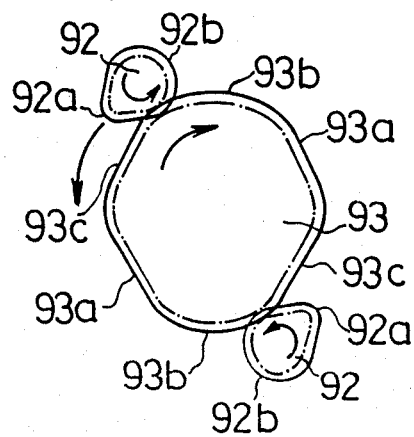

When the non-circular portion 92a of each gear 92 is engaged with the non-circular portions 93a and 93c of the gear 93 as shown in FIGS. 26A and 26C, the rotation force of each gear 92 is transmitted to the gear 93 to rotate the gear 93 in a direction opposite to the revolving direction of each gear 92.

When the circular portion 92b of each gear 92 is engaged with the circular portions 93b of the gear 93 as shown in FIG. 26B, the rotation force of each gear 92 is not transmitted to the gear 93 to stop the gear 93. This results in the sub-arm 4 being temporally stopped in its upright position in the turn process of the wiper arm 5.

Figure 27:
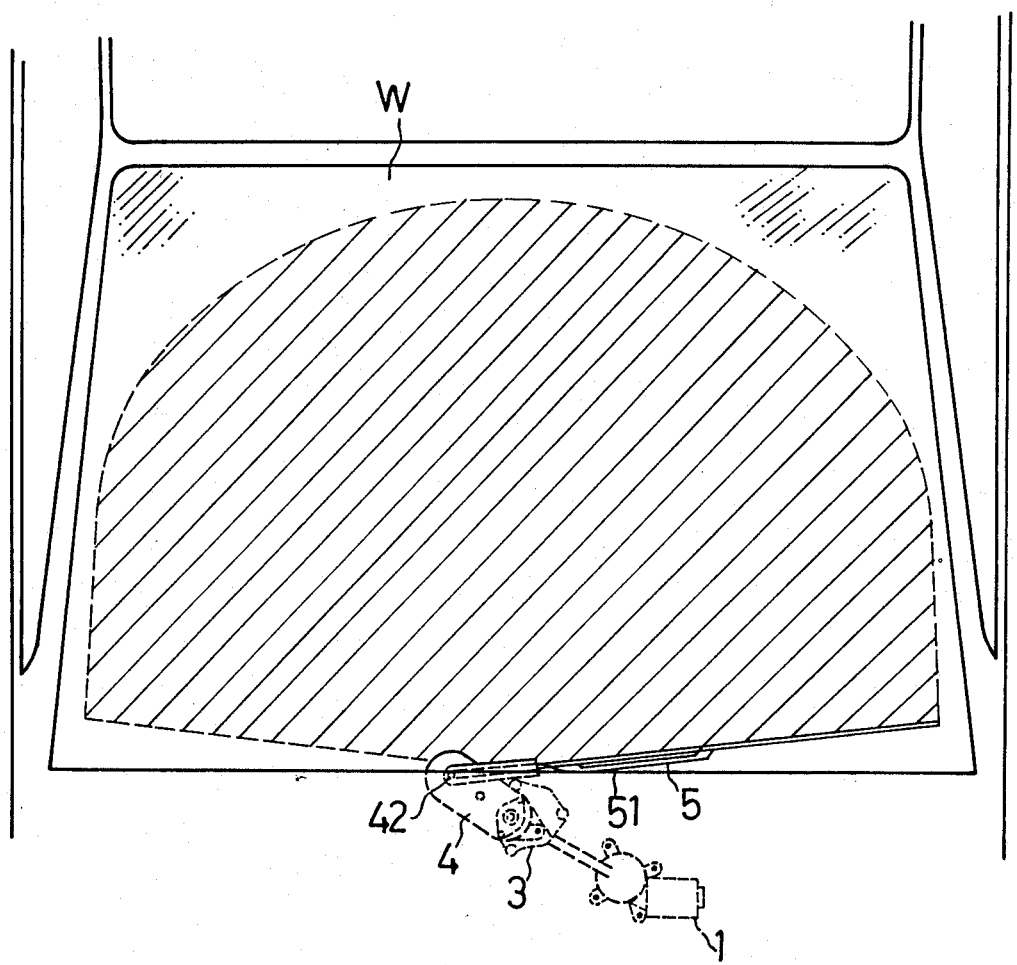
FIG. 27 is a schematic front view of a windshield glass illustrating the operating area of the wiper arm according to a ninth embodiment of the present invention.

FIG. 27 illustrates a ninth embodiment of the wiper device according to the present invention. According to the ninth embodiment, the base end of a metallic retaining member 51 for a wiper blade is extended just under the arm shaft 42 of the wiper arm.

According to the ninth embodiment, an unwiped area in the vicinity of the center of the under side of the windshield glass W as shown in FIG. 1 disappears.

What is claimed is:

1. A wiper device for wiping a window of a vehicle, comprising:
   a wiper arm;
   a sub-arm, one end of said sub-arm being provided with a supporting shaft turnably supported by a body of the vehicle; the other end of said sub-arm being provided with a turnable arm shaft to which a base end of said wiper arm is fixed;
   an arm shaft driving means for reciprocally turning said arm shaft; and
   a supporting shaft driving means for reciprocally turning said supporting shaft and for stopping the turning of said supporting shaft when said sub-arm extends upward of the window glass and when said arm shaft is positioned within a predetermined turning angle range of said arm shaft during each of a forward movement and reciprocating return movement of said arm shaft.

2. A wiper device according to claim 1, wherein said arm shaft driving means and said supporting shaft driving means are connected to a common drive source and said supporting shaft driving means is provided with a connecting means for disabling said supporting shaft from said common drive source within a predetermined turn angle range of said arm shaft.

3. A wiper device according to claim 2, wherein said supporting shaft has a cylindrical shape, and said arm shaft driving means comprises a drive shaft inserted into said supporting shaft, one end of said drive shaft being connected to said arm shaft through a rotation transmission mechanism provided within said sub-arm, and the other end of said drive shaft being connected to said drive source provided inside the body of the vehicle.

4. A wiper device according to claim 2, wherein said clutch means is composed of a Geneva gear fixed to said supporting shaft, and a pin eccentrically provided on a circular plate turned by said drive source, wherein said Geneva gear is engaged with said pin outside said predetermined turn angle range and said Geneva gear is disengaged from said pin within said predetermined turn angle range.

5. A wiper device according to claim 4, wherein said Geneva gear is provided with two circumferentially spaced notches, each notch extending toward a center of rotation of said Geneva gear, and an arc-shaped concave portion in the outer periphery of the Geneva gear between said two notches, and said circular plate is further provided with a semicircular cam portion having an arc-shaped circumferential surface, in the center of said circular plate whereby said pin is closely engaged with one of said notches outside said predetermined turn angle range, and said pin is disengaged from one of said notches and said arc-shaped circumferential surface of said cam portion is fitted in said arc-shaped concave portion within said predetermined turn angle range.

6. A wiper device according to claim 4, wherein said Geneva gear has an elliptical shape, one end portion of said Geneva gear is fixed to said supporting shaft, the other end portion of said Geneva gear being provided with a horseshoe-shaped hole of which both ends are directed toward a center of rotation of said Geneva gear, said pin being insertable into said horseshoe-shaped hole, the under surface of said Geneva gear being further provided with a semicircular cam portion having an arc-shaped circumferential surface, in the center of said circular plate whereby said pin maybe positioned in one of both end portions of said horseshoe-shaped hole and engaged therewith outside said predetermined turn angle range, and said pin moves within an intermediate curved portion of said horseshoe-shaped hole smoothly and said arc-shaped circumferential surface of said cam portion fits in said arc-shaped concave portion within said predetermined turn angle range.

7. A wiper device according to claim 4, wherein said Geneva gear is provided with two circumferentially spaced notches, each extending toward a center of rotation of said Geneva gear, and an arc-shaped groove in the under surface of said Geneva gear between said two notches, and said circular plate is further provided with an arc-shaped cam portion in the position symmetric with respect to said pin, whereby said pin is closely engaged with one of said notches outside said predetermined turn angle range, and said arc-shaped cam portion fits in said arc-shaped groove within said predetermined turn angle range wherein said pin is disengaged from one of said notches.

8. A wiper device according to claim 4, wherein said Geneva gear is provided with circumferentially spaced two notches, each extending toward a center of rotation of said Geneva gear, said supporting shaft being provided with a concave portion in its circumferential surface, a rockable lever being provided between said circular plate and said supporting shaft and one side surface of said lever is brought into contact with a circumferential surface of a cam portion provided in said circular plate, said lever is provided with a convex portion in a side surface opposed to said supporting shaft whereby said pin is closely engaged with one of said notches outside said predetermined turn angle range, and said cam portion pushes said lever toward said supporting shaft and said convex portion of said lever is fitted in said concave portion of said supporting shaft within said predetermined turn angle range wherein said pin is disengaged from one of said notches.

9. A wiper device according to claim 2 wherein said clutch means is composed of an electromagnetic clutch of which the excitation is cancelled within a predetermined turn angle range of said arm shaft.

10. A wiper device according to claim 2, wherein said clutch means is composed of a planetary gears mechanism of which the power transmission is stopped within a predetermined turn angle range of said arm shaft.

* * * * *